(12) United States Patent
Chiu et al.

(10) Patent No.: US 11,907,155 B2
(45) Date of Patent: Feb. 20, 2024

(54) BUS SYSTEM CONNECTING SLAVE DEVICES WITH SINGLE-WIRE DATA ACCESS COMMUNICATION

(71) Applicant: Nuvoton Technology Corporation, Hsinchu (TW)

(72) Inventors: Kang-Fu Chiu, Hsinchu (TW); Chih-Hung Huang, New Taipei (TW); Hao-Yang Chang, Houlong Township, Miaoli County (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 0 days.

(21) Appl. No.: 17/574,090

(22) Filed: Jan. 12, 2022

(65) Prior Publication Data

US 2022/0327086 A1    Oct. 13, 2022

(30) Foreign Application Priority Data

Apr. 13, 2021    (TW) .................................. 110113186

(51) Int. Cl.
G06F 13/42    (2006.01)
G06F 13/38    (2006.01)
G06F 13/40    (2006.01)

(52) U.S. Cl.
CPC .. *G06F 13/4282* (2013.01); *G06F 2213/0002* (2013.01)

(58) Field of Classification Search
CPC ......... G06F 13/4282; G06F 2213/0002; G06F 13/385; G06F 13/4068; G06F 13/4295; G06F 2213/0026

(Continued)

(56) References Cited

U.S. PATENT DOCUMENTS

2008/0294925 A1* 11/2008 Ohno ...................... H04L 25/45
                                                                    713/375
2011/0029705 A1*  2/2011 Evans .................. G06F 13/4291
                                                                    710/110

(Continued)

FOREIGN PATENT DOCUMENTS

CN    110858182 A    3/2020
CN    111045973 A    4/2020

(Continued)

OTHER PUBLICATIONS

Office Action dated Feb. 11, 2022 in TW Application No. 110113186, 6 pages.

*Primary Examiner* — Idriss N Alrobaye
*Assistant Examiner* — Henry W Yu
(74) *Attorney, Agent, or Firm* — Muncy, Geissler, Olds & Lowe, P.C.

(57) ABSTRACT

A bus system is provided. A plurality of slave devices are electrically connected to a master device through an enhanced serial peripheral interface (eSPI) bus. Each slave device has an alert handshake pin. The alert handshake pins of the slave devices are electrically connected together via an alert handshake control line. In a first phase of a plurality of phases in each assignment period of an assignment stage after a synchronization stage, the first slave device is configured to control the alert handshake control line to a second voltage level via the alert handshake pin. In the phases of each of the assignment periods except for the first phase, a first slave device of the slave devices is configured to control the alert handshake control line to communicate with the slave devices via the alert handshake pin. The first phase corresponds to a first slave device.

18 Claims, 9 Drawing Sheets

(58) Field of Classification Search
USPC .............................. 710/3, 31, 110; 713/375
See application file for complete search history.

(56) References Cited

U.S. PATENT DOCUMENTS

| | | | |
|---|---|---|---|
| 2015/0254198 A1* | 9/2015 | Anderson | G06F 13/364 |
| | | | 710/110 |
| 2017/0083467 A1* | 3/2017 | Mishra | G06F 13/4282 |
| 2018/0089120 A1* | 3/2018 | Riekstins | G06F 13/364 |
| 2020/0162010 A1* | 5/2020 | Stephens | H02P 1/42 |
| 2020/0192449 A1* | 6/2020 | Huang | G06F 1/266 |
| 2020/0221362 A1* | 7/2020 | Kessler | H04W 36/305 |

FOREIGN PATENT DOCUMENTS

| | | |
|---|---|---|
| TW | 202004511 A | 1/2020 |
| TW | 202022628 A | 6/2020 |

\* cited by examiner

BUS SYSTEM CONNECTING SLAVE DEVICES WITH SINGLE-WIRE DATA ACCESS COMMUNICATION

CROSS REFERENCE TO RELATED APPLICATIONS

This application claims priority of Taiwan Patent Application No. 110113186, filed on Apr. 13, 2021, the entirety of which is incorporated by reference herein.

BACKGROUND OF THE INVENTION

Field of the Invention

The invention relates to a bus system, and more particularly to a bus system including a plurality of slave devices.

Description of the Related Art

In a conventional computer system, a chip set such as a south bridge chip is electrically connected to another external circuit module (such as a system-on-a-chip (SoC) with various functions) through a low pin count (LPC) interface. The external circuit modules coupled through the LPC interface are respectively assigned to different independent addresses. As a result, the south bridge chip can communicate with the external circuit modules using one-to-many communication. However, in recent years, new bus architectures, such as an enhanced serial peripheral interface (eSPI) bus, began only allowing a one-to-one communication mechanism to be employed between a chip set and the external circuit modules.

Therefore, a scheme capable of scheduling a plurality of circuit modules of a bus is desirable.

BRIEF SUMMARY OF THE INVENTION

Bus systems are provided. An embodiment of a bus system is provided. The bus system includes a master device, an enhanced serial peripheral interface (eSPI) bus, and a plurality of slave devices electrically connected to the master device via the eSPI bus. Each of the plurality of slave devices has an alert handshake pin, and the alert handshake pins of the plurality of slave devices are electrically connected together via an alert handshake control line. When the alert handshake control line is at a first voltage level and a first slave device of the slave devices wants to communicate with the master device, the first slave device is configured to control the alert handshake control line to a second voltage level via the alert handshake pin, so as to control the plurality of slave devices enter a synchronization stage. In a first phase of a plurality of phases of each of assignment periods in an assignment stage after the synchronization stage, the first slave device is configured to control the alert handshake control line to the second voltage level via the alert handshake pin. In the phases of each of the assignment periods except for the first phase, the first slave device is configured to control the alert handshake control line to communicate with the plurality of slave devices other than the first slave device via the alert handshake pin. The first phase corresponds to the first slave device.

Moreover, an embodiment of a bus system is provided. The bus system includes a master device, an enhanced serial peripheral interface (eSPI) bus, and a plurality of slave devices electrically connected to the master device via the eSPI bus. Each of the plurality of slave devices has an alert handshake pin, and the alert handshake pins of the plurality of slave devices are electrically connected together via an alert handshake control line. When the alert handshake control line is at a first voltage level and a first slave device of the slave devices wants to communicate with the master device, the first slave device is configured to control the alert handshake control line to a second voltage level via the alert handshake pin, so as to control the plurality of slave devices enter a synchronization stage. After the synchronization stage, the plurality of slave devices other than the first slave are configured to detect the alert handshake control line in a plurality of phases of each of assignment periods in an assignment stage except for a first phase of the phases, to determine whether to communicate with the first slave device via the alert handshake control line. The first phase corresponds to the first slave device.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, w % herein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
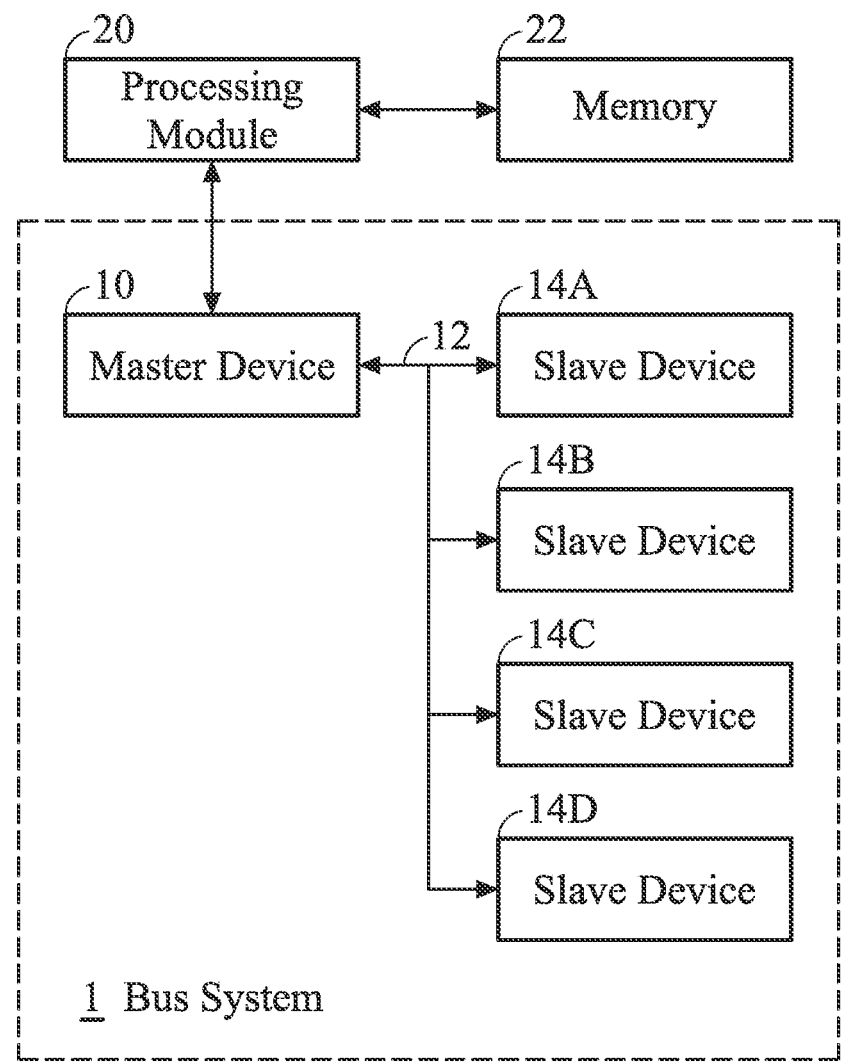
FIG. 1 shows a bus system according to some embodiments of the invention.

FIG. 1 shows a bus system 1 according to some embodiments of the invention. The bus system 1 includes a master device 10, a bus 12, and a plurality of slave devices 14A through 14D. In some embodiments, the master device 10 may be a south bridge chip. In some embodiments, the master device 10 is electrically connected to a processing module 20 of a computer system (not shown), so as to access data with the slave devices 14A through 14D via the bus 12 in response to instruction of the processing module 20. In some embodiments, the processing module 20 is electrically connected to a memory 22 of a computer system, so as to access the memory 22 according to the requests of different application programs. In some embodiments, the bus 12 may be an enhanced serial peripheral interface (eSPI) bus. The master device 10 is electrically connected to the slave devices 14A through 14D via the bus 12. Furthermore, the master device 10 is configured to perform eSPI communication with the slave devices 14A through 14D by using a one-to-one communication mechanism, and the slave devices 14A through 14D are configured to communicate with the master device 10 by using an arbitration mechanism. It should be noted that the number of slave devices 14A through 14D as illustrated is used as an example, and not to limit the invention.

Figure 2:
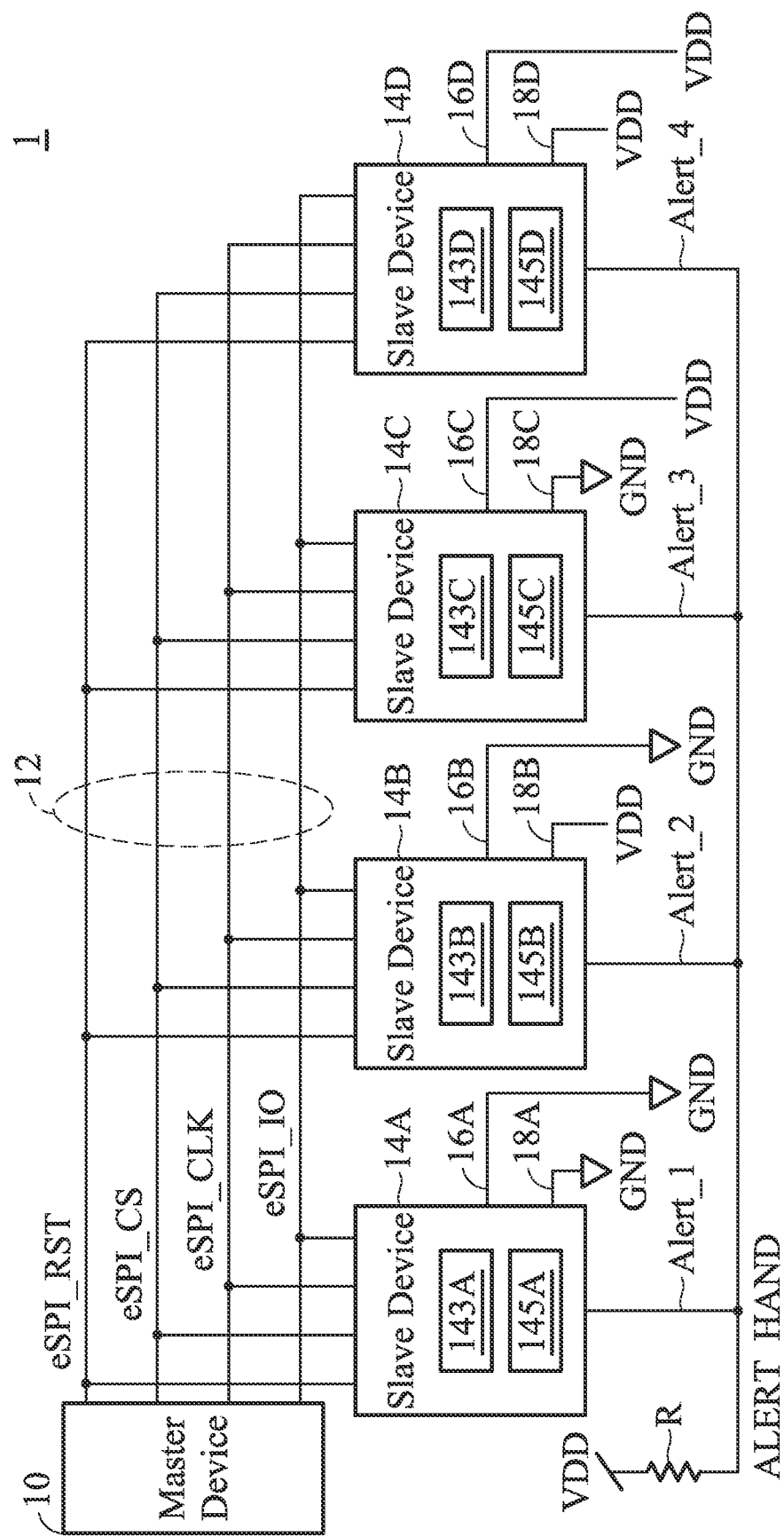
FIG. 2 shows the connection configuration of the bus system in FIG. 1 according to some embodiments of the invention.

FIG. 2 shows the connection configuration of the bus system 1 in FIG. 1 according to some embodiments of the invention. In the embodiment, the bus 12 includes a reset signal line eSPI_RST, a chip select signal line eSPI_CS, a clock signal eSPI_CLK and an input/output signal line eSPI_IO. The master device 10 is configured to perform the eSPI communication with the slave devices 14A through 14D via the chip select signal line eSPI_CS based on one-to-one communication mechanism. Furthermore, based on the arbitration mechanism, the slave devices 14A through 14D are configured to perform the eSPI communication (e.g., data and instruction transmission) with the master device 10 via the input/output signal line eSPI_IO. When the master device 10 communicates with the slave devices 14A through 14D via the bus 12, the clock signal eSPI_CLK is used as a reference clock.

In general, according to the operation mechanism of the chip select signal line eSPI_CS, the master device 10 can only select a single slave device for the eSPI communication. However, in the bus system 1, only one of the slave devices 14A through 14D is able to respond to the master device 10 at a time slot based on the arbitration mechanism. Therefore, when the master device 10 still operates with a one-to-one communication mechanism, the bus 12 can connect the slave devices 14A through 14D to perform the eSPI communication in response to the chip select signal line eSPI_CS, thereby increasing the expandability of the bus system 1.

In FIG. 2, the slave devices 14A through 14D include the address section selection pin 18A through 18D, the address entry selection pin 16A through 16D and the alert handshake pins Alert_1 through Alert_4. The addresses corresponding to the slave devices 14A through 14D can be assigned according to a combination of the voltage levels received by the address section selection pins 18A through 18D and the address entry selection pins 16A through 16D, so that the slave devices 14A through 14D can have different address sections. For example, the address section selection pins 18A and 18C of the slave devices 14A and 14C are coupled to a ground GND, so as to correspond to a first address section. The address entry selection pins 16A and 16C of the slave devices 14A and 14C are coupled to the ground GND and a power supply VDD, so as to respectively correspond to the different address entry codes. For example, they may respectively correspond to a first address and a second address of the first address section. Furthermore, the address section selection pins 18B and 18D of the slave devices 14B and 14D are coupled to the power supply VDD, so as to correspond to a second address section. The address entry selection pins 16B and 16D of the slave devices 14B and 14D are coupled to the ground GND and the power supply VDD, so as to respectively correspond to the different address entry codes. For example, they may respectively correspond to a first address and a second address of the second address section. It should be noted that the configuration of the address entry selection pins 16A through 16D and the address section selection pins 18A through 18D is used as an example and not to limit the invention. In other embodiments, any suitable configuration can be used to set the address section corresponding to the slave devices 14A through 14D.

The alert handshake pins Alert_1 through Alert_4 of the slave devices 14A through 14D are electrically connected to the alert-handshake control line ALERT_HAND. In such embodiment, the alert-handshake control line ALERT_HAND is electrically connected to the power supply VDD through a pull-up resistor R, so that the alert-handshake control line ALERT_HAND is at a high-voltage level (e.g., a high logic signal "H"). Moreover, the scheduling controllers 145A through 145D of the slave devices 14A through 14D can pull the corresponding alert handshake pins Alert_A through Alert_D to a low-voltage level (e.g., a low logic signal "L") for driving the alert-handshake control line ALERT_HAND, so that the alert-handshake control line ALERT_HAND is at a low-voltage level. Thus, each of the slave devices 14A through 14D can obtain the right to actively communicate with the master device 10 by controlling the voltage level of the alert-handshake control line ALERT_HAND. The alert handshake pins Alert_1 through Alert_4 are the bi-directional input/output pins, and the alert handshake pins Alert_1 through Alert_4 are operating as an open drain in the output mode. In some embodiments, the alert-handshake control line ALERT_HAND is electrically connected to the ground GND through a pull-down resistor, so that the alert-handshake control line ALERT_HAND is at a low-voltage level (e.g., a low logic signal "L").

In FIG. 2, each of the slave devices 14A through 14D includes the respective requirement controller 143A through 143D. Taking the slave device 14A as an example, the requirement controller 143A of the slave device 14A is configured to perform the eSPI communicate with the master device 10 via the bus 12. For example, when the slave device 14A communicates with the master device 10, the requirement controller 143A is configured to receive commands and data from the master device 10 via the bus 12, and to provide the corresponding data to the master device 10. Furthermore, the requirement controller 143A of the slave device 14A is further configured to perform the single-wire data Access (SWDA) communication with other slave devices (e.g., the slave device 14B, 14C and/or 14D) and/or the peripheral devices (not shown) via the alert handshake control line ALERT_HAND. For example, when the slave device 14A communicates with the slave device 14B, 14C, and/or 14D, the requirement controller 143A is configured to transmit the commands and data to a single slave device (i.e., one-to-one communication) or multiple slave devices (i.e., one-to-many broadcast) via the alert handshake control line ALERT_HAND. Furthermore, the requirement controller 143A is also configured to receive the commands and data from the slave device 14B. 14C, or 14D via the alert handshake control line ALERT_HAND. Moreover, each of the slave devices 14A through 14D further includes the respective scheduling controllers 145A through 145D. Each of the scheduling controllers 145A through 145D is configured to control the alert handshake control line ALERT_HAND for communication sequence of the eSPI communication and/or the SWDA communication. In addition, the priority of the alert handshake control line ALERT_HAND controlled by the slave device 14A through 14D is determined by the address section selection pins 18A through 18D and the address entry selection pins 16A through 16D in FIG. 2. In other embodiments, other hardware or software settings can be used to determine the priority of the alert handshake control line ALERT_HAND controlled by the slave device 14A through 14D.

In some embodiments, when the slave device 14A performs the eSPI communication with the master device 10, if the slave device 14A detects that the command transmitted by the master device 10 via the bus 12 is abnormal, for example, the master device 10 attacks the slave device 14A to steal the internal data of the slave device 14A, the slave device 14A can instantly perform the SWDA communication via the alert handshake control line ALERT_HAND, so as to broadcast to the slave devices 14B through 14D for notifying that the operation of the master device 10 is abnormal currently. Therefore, the slave devices 14B through 14D can avoid performing the eSPI communication with the master device 10 that is operating abnormally.

Figure 3:
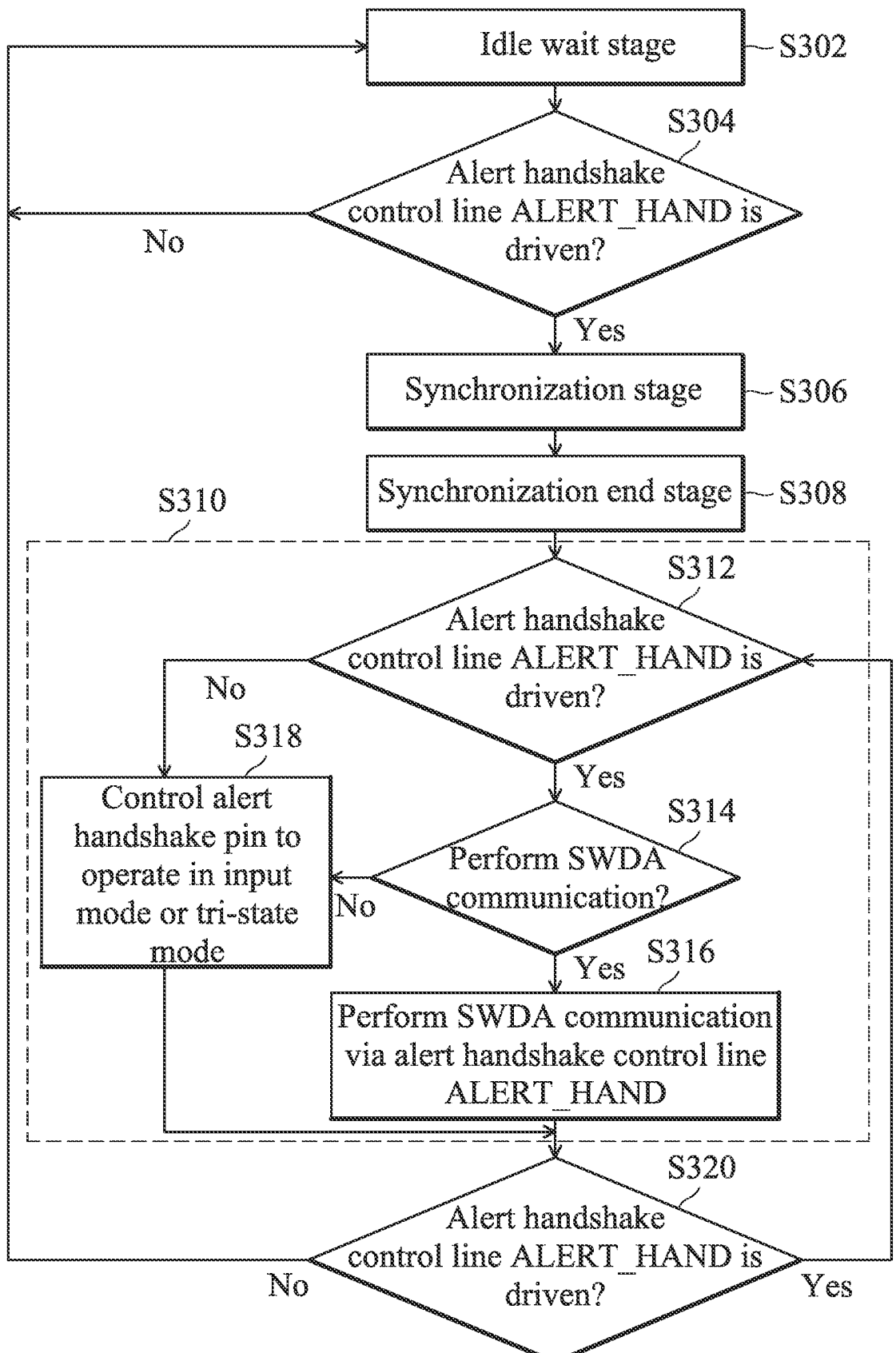
FIG. 3 shows a flowchart illustrating a scheduling control method of the SWDA communication of the bus system according to some embodiments of the invention.
Figure 4A:
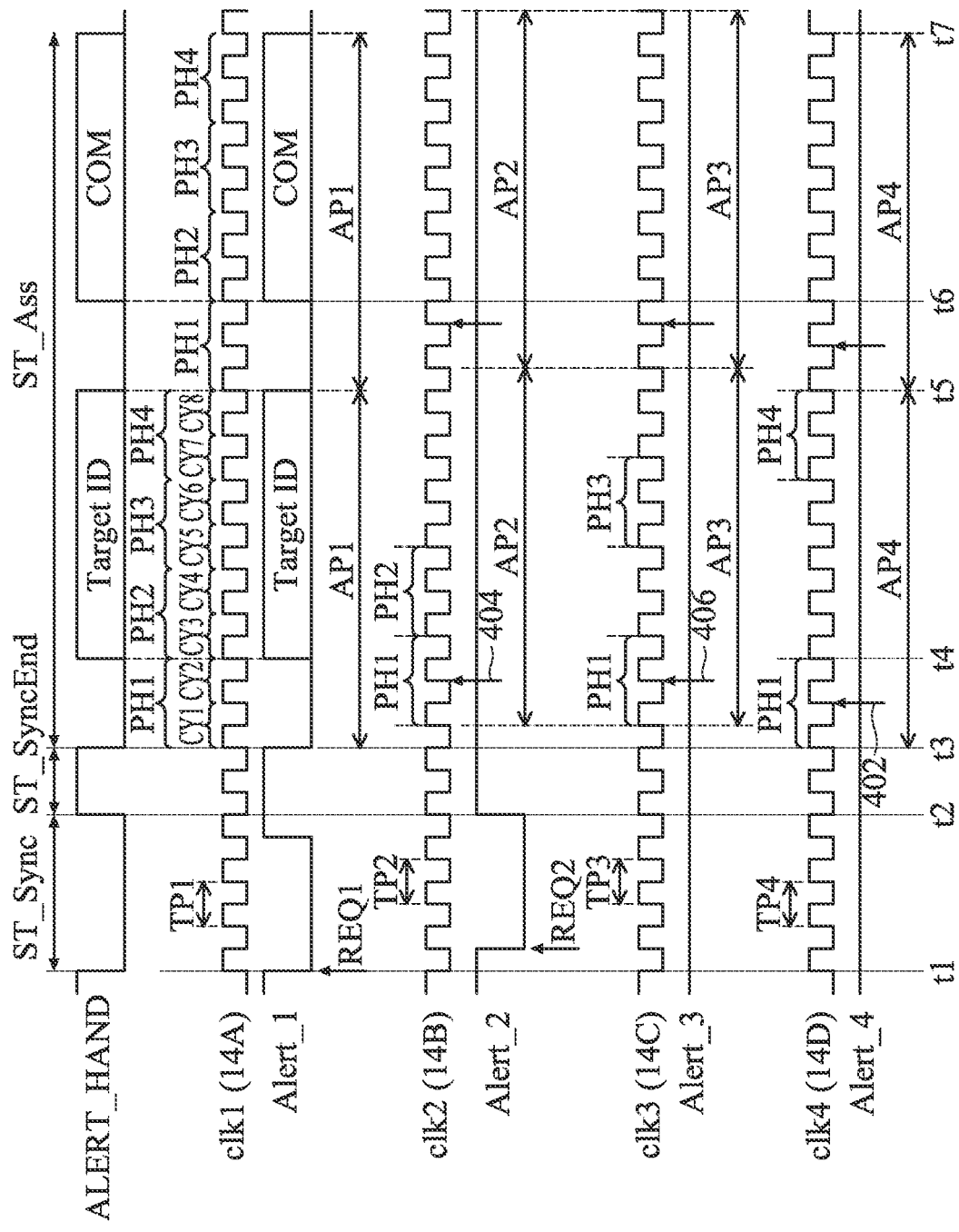
FIG. 4A and FIG. 4B show an exemplary waveform of the alert handshake control line, to illustrate the operation that the slave devices drive the alert handshake control line according to the scheduling control method of the SWDA communication in FIG. 3.
Figure 4B:
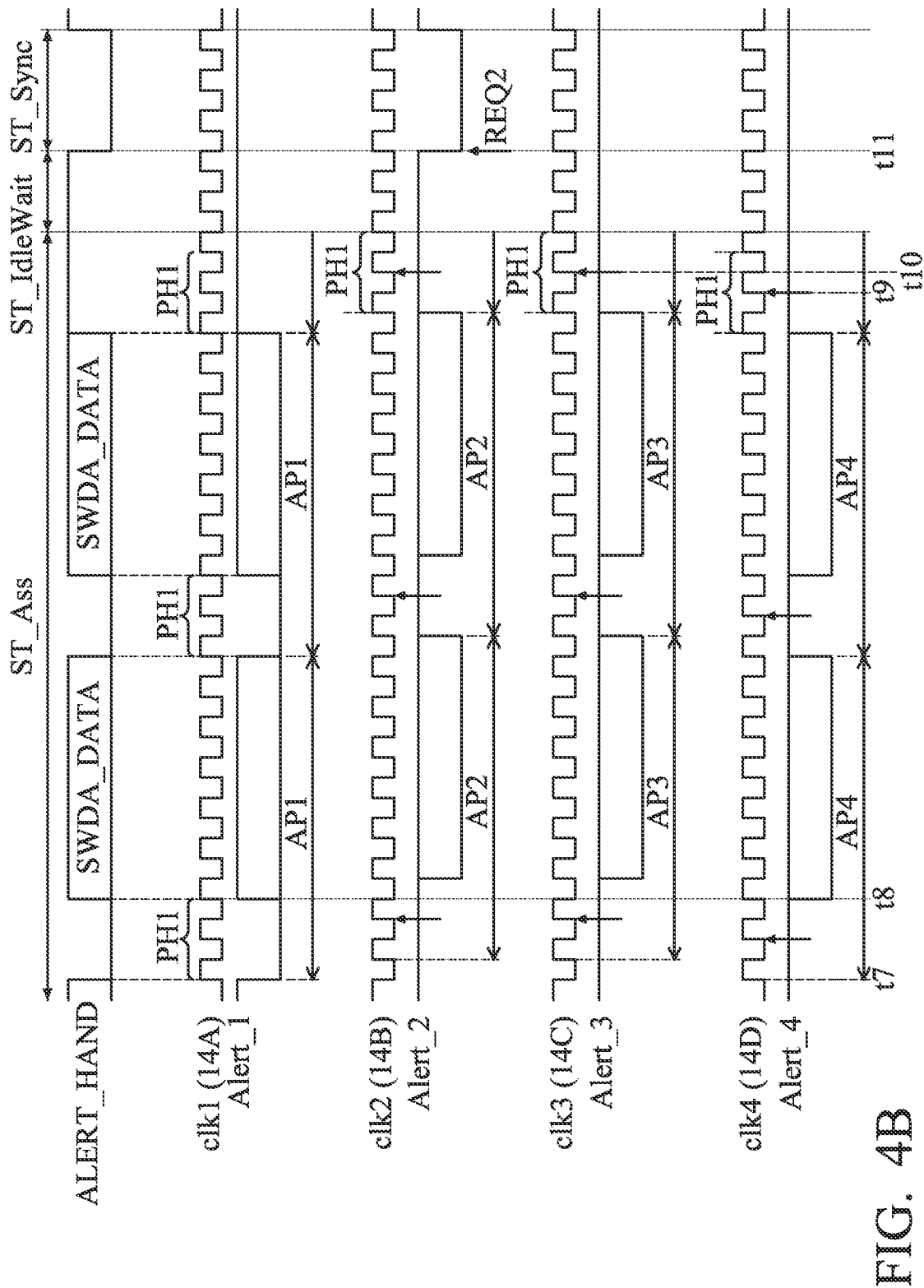

FIG. 3 shows a flowchart illustrating a scheduling control method of the SWDA communication of the bus system 1 according to some embodiments of the invention. The scheduling control method shown in FIG. 3 can be executed by each of the scheduling controllers 145A through 145D of the slave devices 14A through 14D in the bus system 1. FIGS. 4A and 4B show an exemplary waveform of the alert handshake control line ALERT_HAND, to illustrate the operation that the slave devices 14A through 14D drive the alert handshake control line ALERT_HAND according to the scheduling control method of the SWDA communication in FIG. 3. Furthermore, the waveform of the clock signals clk1 through clk4 and the alert handshake control line ALERT_HAND shown in FIGS. 4A and 4B are merely examples and not to limit the invention.

Referring to FIG. 3 and FIGS. 4A and 4B together, the slave devices 14A through 14D are configured to use the clock signals clk1 through clk4 having the same frequency as the counting basis for the scheduling controllers 145A through 145D. In some embodiments, the clock signals clk1 through clk4 have the same phase. In some embodiments, the clock signals clk1 through clk4 have different phases. In some embodiments, the clock signals clk1 through clk4 have the same frequencies, and the clock signals clk1 through clk4 have the same time period, that is, TP1=TP2=TP3=TP4. In some embodiments, the scheduling controllers 145A through 145D are configured to perform the counting operations according to the rising edges of the clock signals clk1 through clk4. In some embodiments, the scheduling controllers 145A through 145D are configured to perform the counting operations according to the falling edges of the clock signals clk1 through clk4.

When detecting that the alert handshake control line ALERT_HAND is not driven, the scheduling controllers 145A through 145D are configured to control the slave devices 14A through 14D to enter the idle wait stage ST_IdleWait (step S302). In the idle wait stage ST_IdleWait, the scheduling controllers 145A through 145D of the slave devices 14A through 14D are configured to control the corresponding alert handshake pins Alert_1 through Alert_4 to operate in the input mode, so as to monitor whether the alert handshake control line ALERT_HAND is driven by any one of the slave devices 14A through 14D (step S304), for example, the alert handshake control line ALERT_HAND is changed from the high voltage level to the low voltage level.

In step S304, when detecting that the alert handshake control line ALERT_HAND is not driven by any one of slave devices 14A through 14D, each of the scheduling controllers 145A through 145D is configured to control the slave devices 14A through 14D to keep operating in the idle wait stage ST_IdleWait (step S302), until the alert handshake control line ALERT_HAND is driven (step S304). When detecting that the alert handshake control line ALERT_HAND is driven (e.g., the alert handshake control line ALERT_HAND is at the low voltage level), each of the scheduling controllers 145A through 145D is configured to control the slave devices 14A through 14D to enter the synchronization stage ST_Sync (step S306). Therefore, the slave devices 14A through 14D of the bus system 1 are configured to enter the synchronization stage ST_Sync at the same time.

After the bus system 1 enters the synchronization stage ST_Sync (step S306), the slave device requesting an interrupt is configured to control the alert handshake pin thereof to operate in the output mode and then to output the low voltage level, so as to drive the alert handshake control line ALERT_HAND by clock cycles more than a specific number (e.g., more than three clock cycles), thereby facilitating other slave devices in the bus system 1 to distinguish that the bus system 1 enters the synchronization stage ST_Sync rather than other stage (e.g., the assignment stage ST_Ass). After the alert handshake control line ALERT_HAND is driven by more than three clock cycles, the slave device requesting the interrupt is configured to stop driving the alert handshake control line ALERT_HAND, and then to control the alert handshake pin thereof to operate in the input mode, so as to monitor the alert handshake control line ALERT_HAND. At the same time, other slave devices of the bus system 1 are configured to detect that the alert handshake control line ALERT_HAND is recovered as the high voltage level, so that all slave devices can simultaneously enter the synchronization end stage ST_SyncEnd (step S308).

In the synchronization end stage ST_SyncEnd, each of the scheduling controllers 145A through 145D are configured to wait at least one clock cycle, to ensure that all slave devices 14A through 14D of the bus system 1 complete the synchronization stage ST_Sync, and then the scheduling controllers 145A through 145D are configured to control the slave devices 14A through 14D to enter the assignment stage ST_Ass from the synchronization end stage ST_SyncEnd (step S310).

After entering the assignment stage ST_Ass, the scheduling controllers 145A through 145D of the slave devices 14A-14D are configured to determine whether there is an interrupt requirement for the SWDA communication and/or the eSPI communication, so as to control the corresponding alert handshake pins Alert_1 through Alert_4 to drive the alert handshake control line ALERT_HAND (step S312). If there is no need to drive the alert handshake control line ALERT_HAND (i.e., no interrupt requirement), the alert handshake pins Alert_1 through Alert_4 are controlled to operate in the input mode or the tri-state mode (step S318 of FIG. 3). If one of the slave devices 14A through 14D drives the alert handshake control line ALERT_HAND via the corresponding alert handshake pin, it is determined whether the slave device needs to perform the SWDA communication (step S314). If the slave device only performs the eSPI communication, the slave device is configured to control the corresponding alert handshake pin to operate in the input mode or the tri-state mode (step S318 in FIG. 3). If the slave device wants to perform the SWDA communication with other the slave devices, the scheduling controller of the slave device is configured to control the corresponding alert handshake pin, so as to control the alert handshake control line ALERT_HAND for the SWDA communication (step S316). Next, when it is detected that the alert handshake control line ALERT_HAND is not driven (step S320), the scheduling controllers 145A through 145D are configured to control the slave devices 14A through 14D to enter the idle wait stage ST_IdleWait again (step S302). If it is detected that the alert handshake control line ALERT_HAND is driven (step S320), the flow returns to step S312.

In the assignment stage ST_Ass of FIGS. 4A and 4B, the slave devices 14A through 14D are configured to monitor state of the alert handshake control line ALERT_HAND via the alert handshake pins Alert_1 through Alert_4 in each of the assignment periods AP1 through AP4. Furthermore, the slave devices 14A through 14D have the assignment periods AP1 through AP4 with the same time periods, respectively. In such embodiment, each of the assignment periods AP1 through AP4 has 2×4 clock cycles CY1 through CY8. Furthermore, each of the assignment periods AP1 through AP4 is divided into four phases PH1 through PH4, and each phase includes two clock cycles. For example, the phase PH1 includes the clock cycles CY1 and CY2, the phase PH2 includes the clock cycles CY3 and CY4, the phase PH3 includes the clock cycles CY5 and CY6, and the phase PH4 includes the clock cycles CY7 and CY8.

In the assignment stage ST_Ass of FIG. 5, each of slave devices 14A through 14D is configured to perform the corresponding operation according to the phases PH1 through PH4. In such embodiment, the slave device 14A corresponds to the phase PH1, the slave device 14B corresponds to the phase PH2, the slave device 14C corresponds to the phase PH3, and the slave device 14D corresponds to the phase PH4. In some embodiments, the corresponding relationship between the slave devices 14A through 14D and the phases PH1 through PH4 is determined by the address section selection pins 18A through 18D and the address entry selection pins 16A through 16D of FIG. 2. In other embodiments, the corresponding relationship between the slave devices 14A through 14D and the phases PH1 through PH4 is determined by other hardware or software configurations.

In FIGS. 4A and 4B, the slave devices 14A through 14D are configured to count the clock cycles CY1 through CY8 of the assignment periods AP1 through AP4 according to rising edges of the clock signals clk1 through clk4 thereof. Moreover, in the assignment stage ST_Ass, when the alert handshake control line ALERT_HAND is not driven, if each of the slave device 14A through 14D wants to perform the eSPI communication with the master device 10 or the SWDA communication with other slave devices 14A through 14D, the slave device has right to drive the alert handshake control line ALERT_HAND in the corresponding phase of its assignment period. For example, if the slave device 14A wants to perform the eSPI communication with the master device 10 or the SWDA communication with the slave devices 14B through 14D, the slave device 14A has right to drive the alert handshake control line ALERT_HAND in the phase PH1 of the assignment period AP1. Specifically, when the slave device 14A performs the eSPI communication and/or the SWDA communication, the scheduling controller 145A of the slave device 14A is configured to control the alert handshake pin Alert_1 to operate in the output mode and output the low voltage level in the phase PH1, so as to drive the alert handshake control line ALERT_HAND (step S312 of FIG. 3), that is the alert handshake control line ALERT_HAND is controlled at the low voltage level.

If the slave device 14A does not need to perform the eSPI communication or the SWDA communication, the scheduling controller 145A of the slave device 14A is configured to control the alert handshake pin Alert_1 to operate in the input mode or the tri-state mode in the phase PH1 (step S318 of FIG. 3), i.e., no driving the alert handshake control line ALERT_HAND. Next, in the phases PH2 through PH4 of the assignment period AP1, the slave device 14A is configured to monitor the voltage level of the alert handshake control line ALERT_HAND, to determine whether the slave devices 14B through 14D have interrupt requirements for the eSPI communication and/or the SWDA communication. In the other words, in the phases PH2 through PH4, the scheduling controller 145A of the slave device 14A is configured to control the alert handshake pin Alert_1 to operate in the input mode. For example, the slave device 14A is configured to monitor the voltage level of the alert handshake control line ALERT_HAND via the alert handshake pin Alert_1 in the phase PH2, so as to determine whether the alert handshake control line ALERT_HAND is driven by the slave device 14B. If the slave device 14A detects that the alert handshake control line ALERT_HAND is at the high voltage level in the phase PH2, the scheduling controller 145A is configured to determine that the slave device 14B does not drive the alert handshake control line ALERT_HAND. If the slave device 14A detects that the alert handshake control line ALERT_HAND is at the low voltage level in the phase PH2, the scheduling controller 145A is configured to determine that the slave device 14B has the interrupt requirements for the eSPI communication and/or the SWDA communication.

Referring to FIG. 4A, in response to an interrupt requirement REQ1, the slave device 14A requests to perform the SWDA communication. Before the slave device 14A wants to communicate with the slave devices 14B through 14D, the slave device 14A is configured to monitor the voltage level of the alert handshake control line ALERT_HAND first, to determine that the alert handshake control line ALERT_HAND is not driven by the slave devices 14B through 14D. Next, at time point t1, the slave device 14A is configured to control the alert handshake pin Alert_1 to operate in the output mode and output the low-voltage-level signal within three clock cycles of the clock signal clk1, so as to drive the alert handshake control line ALERT_HAND for notifying the slave devices 14B through 14D to enter the synchronization stage ST_Sync. Next, at time point t2, after completing the synchronization stage ST_Sync, the slave device 14A is configured to control the alert handshake pin Alert_1 to operate in the input mode, so as to stop driving the alert handshake control line ALERT_HAND. As a result, each of the slave devices 14A through 14D in the bus system 1 enters the synchronization end stage ST_SyncEnd. In some embodiments, in the synchronization end stage ST_SyncEnd, the scheduling controllers 145A through 145D are configured to wait at least one clock cycle, and then to control the slave devices 14A through 14D to enter the assignment stage ST_Ass from the synchronization end stage ST_SyncEnd.

In the assignment stage ST_Ass of FIG. 4A, the slave device 14A can obtain the right to control the alert handshake control line ALERT_HAND, so as to perform the eSPI communication with the master device 10 and/or the SWDA communication with other slave devices. Therefore, at time point 3, the alert handshake control line ALERT_HAND is changed to the low voltage level in the phase PH1 of the assignment period AP1 of the slave device 14A. Thus, the slave device 14A obtains the right to perform the SWDA communication and/or the eSPI communication. Next, the slave device 14D is configured to detect that the alert handshake control line ALERT_HAND is at the low voltage level in the phase PH1 of the assignment period AP4 (as shown by arrow 402). Therefore, the slave device 14D detects that the slave device 14A corresponding to the phase PH1 needs to perform the SWDA communication and/or the eSPI communication (e.g., processing the interrupt requirement). Next, the slave device 14B is configured to detect that the alert handshake control line ALERT_HAND is at the low voltage level in the phase PH1 of the assignment period AP2 (as shown by arrow 404). Thus, the slave device 14B determines that the slave device 14A corresponding to the phase PH1 needs to perform the SWDA communication and/or the eSPI communication (e.g., processing the interrupt requirement). At the same time, the slave device 14C is also configured to detect that the alert handshake control line ALERT_HAND is at the low voltage level in the phase PH1 of each assignment period AP3 (as shown by arrow 406). Therefore, the slave device 14C determines that the slave device 14A corresponding to the phase PH1 is performing the SWDA communication and/or the eSPI communication (e.g., processing the interrupt requirement).

In some embodiments of the eSPI communication, when the slave device 14A is in communication with the master device 10, the slave device 14A is configured to provide an event alert signal ALERT to the input/output signal line eSPI_IO of the bus 12 via the input/output signal line eSPI_IO1, so as to transmit the event alert signal ALERT to the master device 10. The event alert signal ALERT indicates the request signal of the slave device 14A for communication with the master device 10. When detecting that the alert handshake control line ALERT_HAND is driven by the slave device 14A, one of slave devices 14B to 14D, which wants to communicate with the master device 10, is configured to store the event message and then wait for the control right of the alert handshake control line ALERT_HAND to communicate with the master device 10. When the slave device 14A performs the eSPI communication with the master device 10, the slave device 14A is configured to drive the alert handshake control line ALERT_HAND in the PH1 phase of each assignment period AP1 until the completion of eSPI communication with the master device 10. Similarly, when the slave device 14A performs the SWDA communication with other slave device, the slave device 14A is configured to drive the alert handshake control line ALERT_HAND in the phase PH1 of each assignment period AP1 until the completion of SWDA communication. After completing the eSPI communication and the SWDA communication, the slave device 14A is configured to not drive the alert handshake control line ALERT_HAND in the phase PH1 of the assignment period AP1, so the slave devices 14A through 14D will enter the idle wait stage ST_IdleWait after the phase PH1. As described above, in the idle wait stage ST_IdleWait, the scheduling controllers 145A through 145D of the slave devices 14A through 14D are configured to control the corresponding alert handshake pins Alert_1 through Alert_4 to operate in the input mode, so as to monitor whether the alert handshake control line ALERT_HAND is driven by any one of the slave devices 14A through 14D.

At time point t4, when the slave device 14A is performing the SWDA communication, the slave device 14A is configured to control the alert handshake pins Alert_1 to operate in the output mode during the phases PH2 through PH4 of the assignment period AP1, and to transmit the target identification Target_ID to each of the slave devices 14B through 14D via the alert handshake control line ALERT_HAND, so as to notify the slave device corresponding to the target identification Target_ID for the SWDA communication. In addition, for the slave devices 14B through 14D, the alert handshake pins Alert_2 through Alert_4 are controlled to operate in the input mode during the phases PH2 through PH4 of the corresponding assignment periods AP2 through AP4, so that the target identification Target_ID from the slave device 14A is obtained via the alert handshake control line ALERT_HAND. In some embodiments, the target identification Target_ID from the slave device 14A only includes the identification ID of a single slave device. In some embodiments, the target identification Target_ID from the slave device 14A includes the identification ID of the multiple slave devices. In such embodiments, the slave device 14A is the master or transmitter of the SWDA communication, and the slave device with the identification ID corresponding to the target identification Target_ID is the slave or receiver of the SWDA communication.

In the bus system 1, each of the slave devices 14A through 14D has an individual identification ID. In some embodiments, the identification ID of the slave devices 14A through 14D are determined by the address section selection pins 18A-18D and the address entry selection pins 16A-16D. In some embodiments, the identification ID of the slave devices 14A through 14D are related to the priority order of the alert handshake control line ALERT_HAND of the slave devices 14A through 14D.

For the slave devices 14B through 14D, the alert handshake pins Alert_2 through Alert_4 are controlled to operate in the input mode during the phases PH2 through PH4 of the corresponding assignment periods AP2 through AP4, so as to obtain the target identification Target_ID from the slave device 14A via the alert handshake control line ALERT_HAND. In some embodiments, the target identification Target_ID from the slave device 14A only includes the identification ID of a single slave device. In some embodiments, the target identification Target_ID from the slave device 14A includes the identification ID of the multiple slave devices.

After obtaining the target identification Target_ID, the slave devices 14B through 14D are configured to further determine whether the slave device 14A requires performing the SWDA communication. For example, if the target identification Target_ID includes the identification ID of the slave device 14B, it means that the slave device 14A needs to perform the SWDA communication with the slave device 14B. If the target identification Target_ID includes the identification ID of all other slave devices 14B through 14D, it means that the slave device 14A wants to broadcast to other slave devices 14B through 14D.

Next, at time point t5, the slave device 14A is configured to change the alert handshake control line ALERT_HAND to a low voltage level during the phase PH1 in the assignment period AP1. Therefore, the slave device 14A can continue to obtain the right to perform the SWDA communication and/or the eSPI communication. Next, at time point t6, the slave device 14A is configured to control the alert handshake pins Alert_1 to operate in the output mode during the phases PH2 through PH4 of the assignment period AP1, and to transmit the command COM via the alert handshake control line ALERT_HAND. Thus, after receiving the command COM from the slave device 14A via the alert handshake control line ALERT_HAND, the slave device with the identification ID corresponding to the target identification Target_ID is configured to perform subsequent operations in response to the command COM. In some embodiments, the command COM includes the read command, the write (program) command, the setting command, and so on.

Referring to FIG. 4B, at time point 7, the slave device 14A is configured to change the alert handshake control line ALERT_HAND to a low voltage level during the phase PH1 in the assignment period AP1. Therefore, the slave device 14A can continue to obtain the right to perform the SWDA communication and/or the eSPI communication. Next, starting from time point t8, the slave device 14A and the slave device with the identification ID corresponding to the target identification Target_ID are configured to control the corresponding alert handshake pins during the phases PH2 through PH4 of the assignment period AP1, so as to perform the command COM via the alert handshake control line ALERT_HAND.

In some embodiments, it is assumed that the command COM is a write command, and the target identification Target_ID includes the identification ID of the slave devices 14B through 14D. In such embodiment, the slave device 14A is configured to control the alert handshake pins Alert_1 to operate in the output mode during the phases PH2 through PH4 in the assignment period AP1, so as to transmit the data SWDA_DATA via the alert handshake control line ALERT_HAND. At the same time, in response to the command COM from the slave device 14A, the slave devices 14B through 14D are configured to control the alert handshake pins Alert_2 through Alert_4 to operate in the input mode during the phases PH2 through PH4 of the assignment periods AP2 through AP4, respectively, so as to receive the data SWDA_DATA from the slave device 14A via the alert handshake control line ALERT_HAND. Next, the slave devices 14B through 14D are configured to store the received data SWDA_DATA or to perform subsequent operations. In some embodiments, if the command COM is a setting command, the slave devices 14B through 14D are configured to perform corresponding settings according to the data SWDA_DATA.

In some embodiments, it is assumed that the command COM is a read command, and the target identification Target_ID includes the identification ID of the slave device 14B. In such embodiments, in response to the received command COM, the slave device 14B is configured to control the alert handshake pins Alert_2 to operate in the output mode during the phases PH2 through PH4 of the assignment period AP2, so as to transmit the data SWDA_DATA to the slave device 14A via the alert handshake control line ALERT_HAND. In addition, the slave device 14A is configured to control the alert handshake pins Alert_1 to operate in the input mode during the phases PH2 through PH4 of the assignment period AP1, so as to receive the data SWDA_DATA from the slave device 14B via the alert handshake control line ALERT_HAND. Next, the slave device 14A is configured to store the received data SWDA_DATA or to perform subsequent operations according to the received data SWDA_DATA.

In the bus system 1, in response to the command COM, each of the slave devices 14A through 14D is configured to control the corresponding alert handshake pins Alert_1 through Alert_4 to operate in the input mode or in the output mode, so as to receive or transmit the data SWDA_DATA for the SWDA communication. Next, the slave device 14A is configured to drive the alert handshake control line ALERT_HAND in the phase PH1 of each assignment period AP1 until the SWDA communication is completed.

At time t9, the slave device 14D is configured to detect that the alert handshake control line ALERT_HAND changes to the high voltage level in the phase PH1 of the assignment period AP4. Therefore, the slave device 14D obtains that the slave device 14A has completed the SWDA communication. Next, at time point t10, the slave devices 14B and 14C are configured to detect that the alert handshake control line ALERT_HAND is changed to the high voltage level in the phase PH1 of the assignment periods AP2 and AP3, respectively. Thus, the slave devices 14B and 14C know that the slave device 14A has completed the SWDA communication. Next, the scheduling controllers 145B through 145D are configured to control the slave devices 14B through 14D to enter the idle wait stage ST_IdleWait. In other words, after completing the SWDA communication and/or the eSPI communication, the slave device 14A does not drive the alert handshake control line ALERT_HAND in the phase PH1 of the assignment period AP1, so the slave devices 14A through 14D enter the idle wait phase ST_IdleWait after the phase PH1. As described above, in the idle wait stage ST_IdleWait, the scheduling controllers 145A through 145D of the slave devices 14A through 14D are configured to control the corresponding alert handshake pins Alert_1 through Alert_4 to operate in the input mode, so as to monitor whether the alert handshake control line ALERT_HAND is driven by any of the slave devices 14A through 14D.

At time point t11, when the slave device 14B also has an interrupt request REQ2, the slave device 14B is configured to control the alert handshake pins Alert_2 to operate in the output mode and to output the low voltage level within 3 clock cycles of the clock signal clk2, to drive the alert handshake control line ALERT_HAND, so as to notify the slave device 14A, 14C and 14D to enter the synchronization phase ST_Sync. Next, the bus system 1 sequentially enters the synchronization end stage ST_SyncEnd and the assignment stage ST_Ass. As described above, in the assignment stage ST_Ass, the slave device 14B is configured to control the alert handshake pins Alert_2 to operate in the output mode in the phase PH2 of the assignment period AP2, and to output a low voltage level to drive the alert handshake control line ALERT_HAND, so as to perform the SWDA communication and/or the eSPI communication.

In some embodiments, the signal transmitted by the bus system 1 during the SWDA communication via the alert handshake control line ALERT_HAND (e.g., the target identification Target_ID, the command COM and the data SWDA_DATA, etc.) will maintain two clock cycles, to avoid that the phase difference between the clock signals clk1 through clk4 of the slave devices 14A through 14D from causing data sampling errors between the slave devices 14A through 14D.

In the embodiments of the invention, the signals and/or packets transmitted in the SWDA communication via the alert handshake control line ALERT_HAND are just an example. In other embodiments, the slave devices 14A through 14D are configured to transmit signals and packets of any types of protocols via the alert handshake control line ALERT_HAND, such as the serial communication protocols (e.g., I2C, UART, and SPI).

Figure 5A:
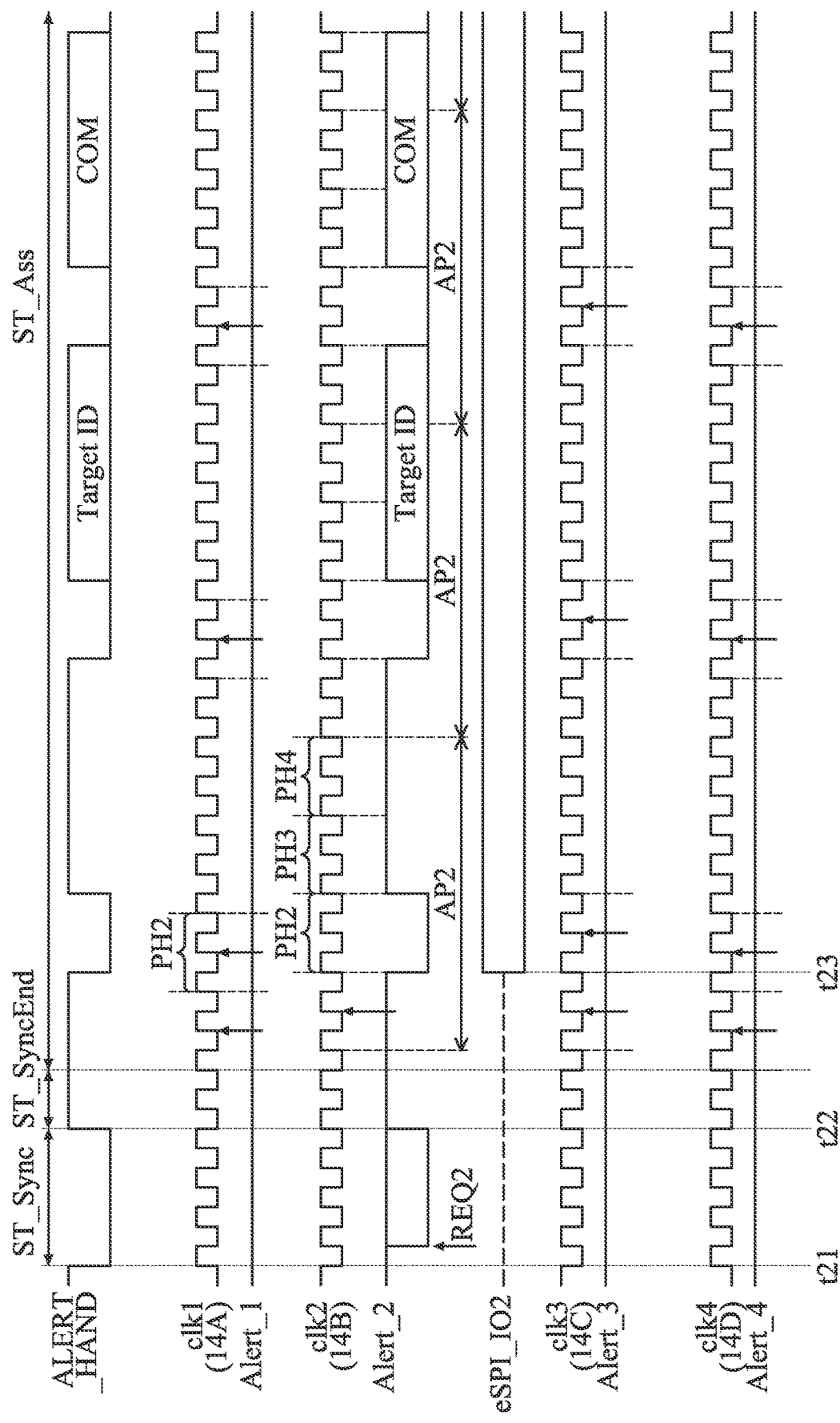
FIG. 5A and FIG. 5B show a waveform of the alert handshake control line for illustrating the operation of the slave devices that driving the alert handshake control line according to the scheduling control method in FIG. 3.
Figure 5B:
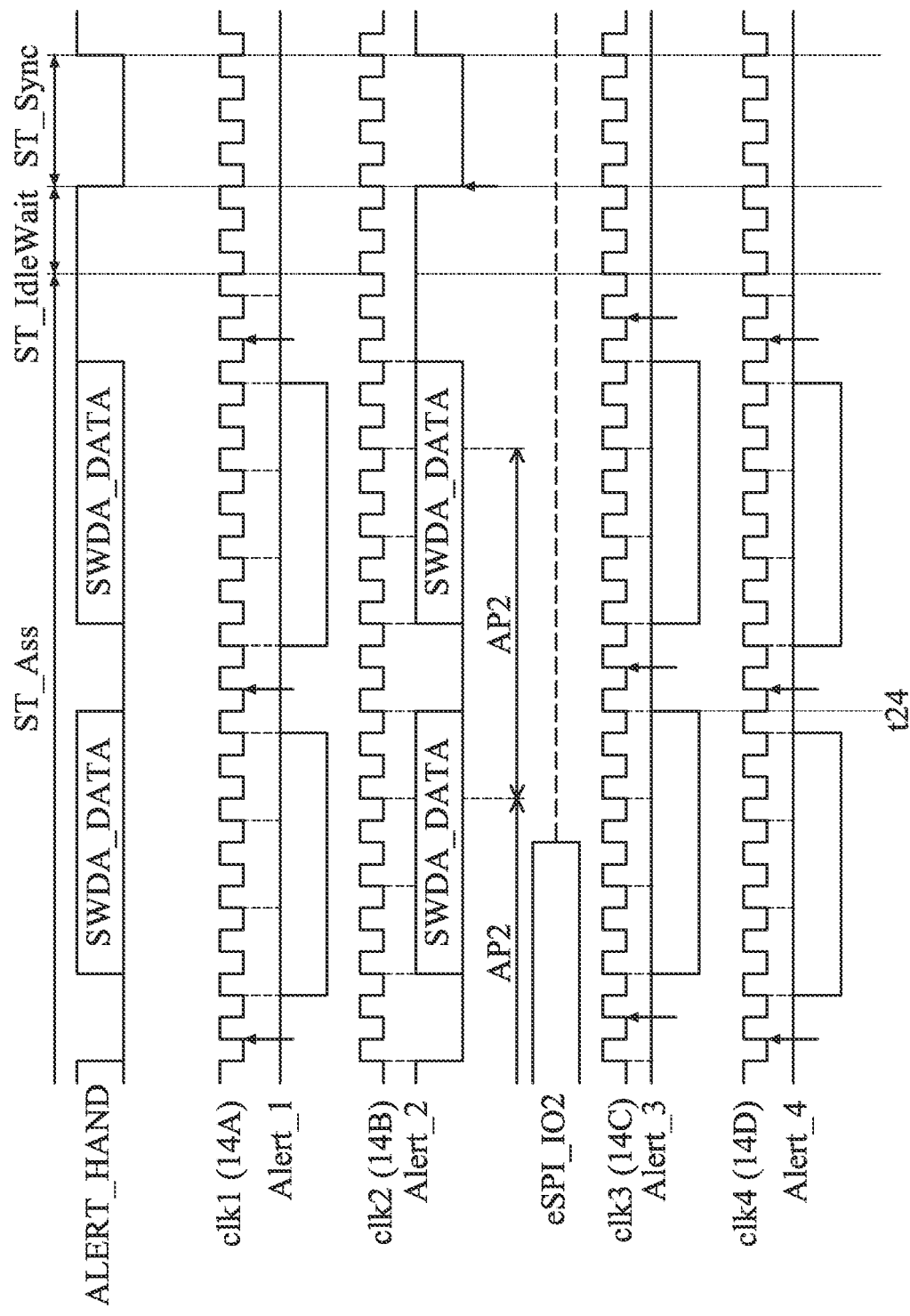

FIGS. 5A and 5B show a waveform of the alert handshake control line ALERT_HAND for illustrating the operation of the slave devices 14A through 14D that driving the alert handshake control line ALERT_HAND according to the scheduling control method in FIG. 3. Moreover, the waveforms of the clock signals clk1 through clk4 and the alert handshake control line ALERT_HAND shown in FIGS. 5A and 5B are only examples, and are not intended to limit the invention.

In response to the interrupt requirement REQ2, the slave device 14B needs to perform the eSPI communication and the SWDA communication. Before the slave device 14B performs the eSPI communication and the SWDA communication, the slave device 14B is configured to first monitor the voltage level of the alert handshake control line ALERT_HAND, to determine that the alert handshake control line ALERT_HAND is not driven by the slave devices 14A, 14C and 14D. Next, at time point t21, the slave device 14B is configured to control the alert handshake pins Alert_2 to operate in the output mode and to output the low voltage level within 3 clock cycles of the clock signal clk1, so as to drive the alert handshake control line ALERT_HAND for notifying the slave devices 14A, 14C and 14D to enter the synchronization phase ST_Sync. At time point t22, after completing the synchronization phase ST_Sync, the slave device 14B is configured to control the alert handshake pins Alert_2 to operate in the input mode, so as to stop driving the alert handshake control line ALERT_HAND. Therefore, each of the slave devices 14A through 14D of the bus system 1 enters the synchronization end stage ST_SyncEnd. In some embodiments, in the synchronization end stage ST_SyncEnd, each of the scheduling controllers 145A through 145D is configured to wait for at least one clock cycle, and then the scheduling controllers 145A through 145D are configured to control the slave devices 14A through 14D to enter the assignment stage ST_Ass from the synchronization end stage ST_SyncEnd.

In the assignment stage ST_Ass, the slave device 14B is configured to obtain the control right of the alert handshake control line ALERT_HAND, so as to perform eSPI communication with the master device 10 and the SWDA communication. Therefore, at time point t23, the alert handshake control line ALERT_HAND is configured to change to the low voltage level during the phase PH2 in the assignment period AP2 of the slave device 14B. Thus, the slave device 14B can obtain the right to perform the SWDA communication and/or the eSPI communication. At the same time, the slave device 14B is configured to communicate with the master device 10 via its input/output signal line eSPI_IO2. In the assignment period AP2, the slave device 14B is configured to only perform the eSPI communication. Therefore, the slave device 14B does not drive the alert handshake control line ALERT_HAND during the phases PH3 and PH4. Next, since the slave device 14B still has the requirement for the eSPI communication and the SWDA communication, the slave device 14B is configured to drive the alert handshake control line ALERT_HAND in the phase PH2 of each assignment period AP2 until the eSPI communication and the SWDA communication are completed. For example, at time point t24 in FIG. 5B, although the slave device 14B has completed the eSPI communication, but the SWDA communication has not yet been completed. Therefore, the slave device 14B is configured to control the alert handshake control line ALERT_HAND to be the low voltage level during the phase PH2 of the assignment period AP2, so as to continue the SWDA communication.

Figure 6:
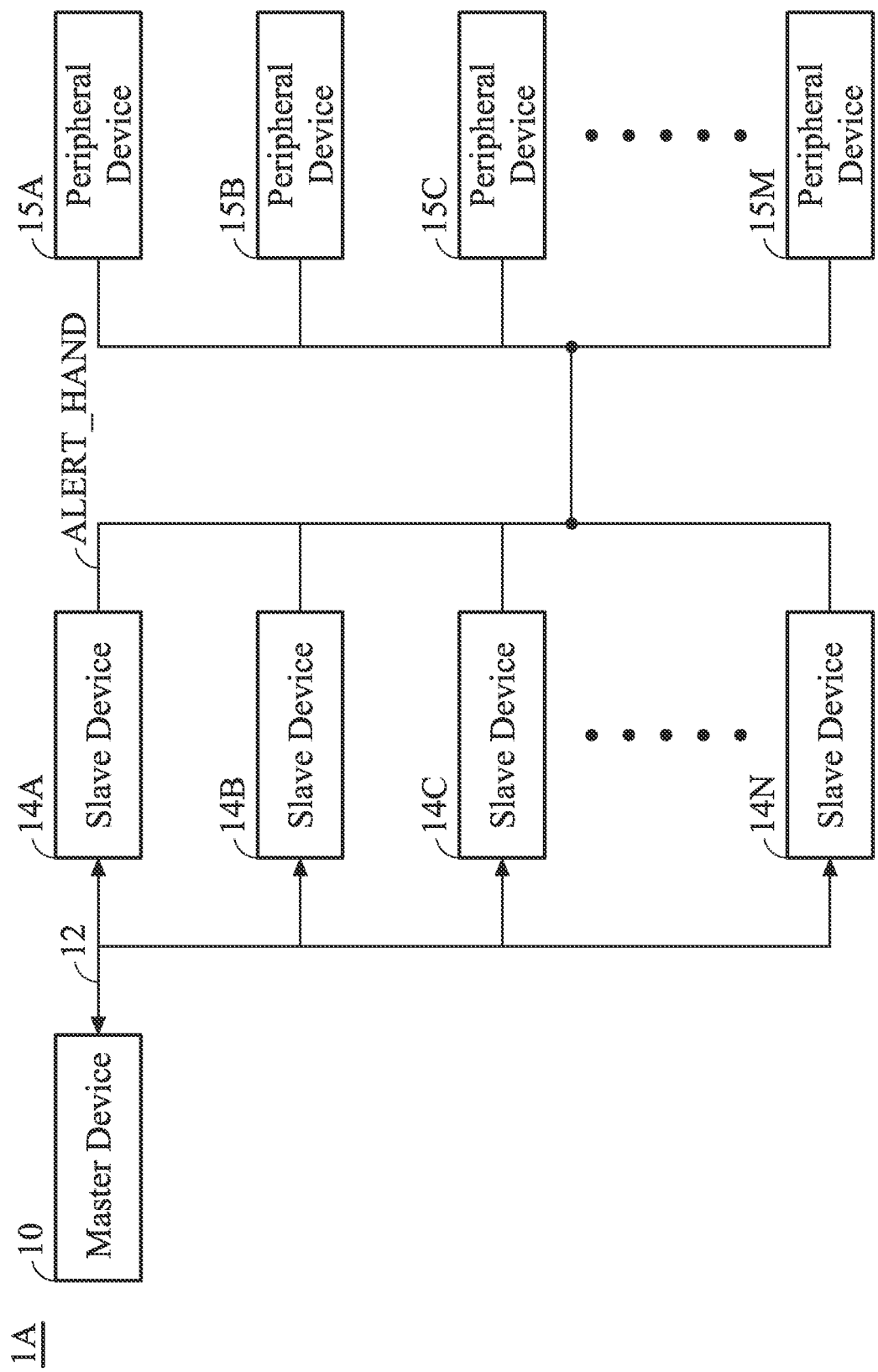
FIG. 6 shows the connection configuration of a bus system according to some embodiments of the invention.

FIG. 6 shows the connection configuration of a bus system 1A according to some embodiments of the invention. As previously described, the bus 12 is an eSPI bus. The master device 10 is electrically connected to the slave devices 14A through 14N via the bus 12. In addition, the master device 10 performs the eSPI communication with the slave devices 14A through 14N by using a one-to-one communication mechanism, and the slave devices 14A through 14N communicate with the master device 10 by using an arbitration mechanism. It should be noted that the number of the slave devices 14A through 14N is only an example, and is not intended to limit the invention.

As described above, the alert handshake pins of the slave devices 14A through 14N are electrically connected to the alert handshake control line ALERT_HAND. In some embodiments, the alert handshake control line ALERT_HAND is electrically connected to the power supply VDD via a pull-up resistor (not shown). In some embodiments, the alert handshake control line ALERT_HAND is electrically connected to the ground GND via a pull-down resistor (not shown).

In some embodiments, any one of the slave devices 14A through 14N in the bus system 1A is configured to store non-real-time and important data in other slave devices, so as to avoid the data being stolen when the bus system 1A is attacked. For example, the slave device 14A may store some important data (such as encryption/decryption keys, etc.) in the other slave devices 14B through 14N. When the data is needed, the slave device 14A is configured to obtain the data by performing the SWDA communication with the slave devices 14B through 14N via the alert handshake control line ALERT_HAND. Moreover, the SWDA communication can support encrypted data transmission, to avoid the signals and packets on the alert handshake control line ALERT_HAND from being stolen during transmission.

In some embodiments, when any one of the slave devices 14A through 14N in the bus system 1A is busy, the slave device may provide the data to be processed to other idle slave devices with the SWDA communication, and then other slave devices can share a part of the computing operations, so as to improve the system efficiency of the bus system 1A. For example, when the slave device 14A is busy, the slave device 14A is configured to provide the data to be processed to the slave devices 14B through 14N with the SWDA communication to share the computing operations. When completing the computing operations, the slave devices 14B through 14N are configured to send back the processed data to the slave device 14A or to perform the corresponding operations.

In the bus system 1A, the slave devices 14A through 14N are further electrically connected to the peripheral devices 15A through 15M via the alert handshake control line ALERT_HAND. In some embodiments, the peripheral devices 15A through 15M are fans for dissipating heat from the bus system 1A. For example, when the slave device 14A is busy, the slave device 14A may notify one of the idle (or standby) slave devices 14B through 14N to control the fans 15A through 15M with the SWDA communication. Thus, the idle slave device may use the time-sharing multiplexing method to control each of the fans 15A through 15M in sequence via the alert handshake control line ALERT_HAND. In other words, in the bus system 1A, any one of the slave devices 14A through 14N may control each of the peripheral devices 15A through 15M via the alert handshake control line ALERT_HAND. In some embodiments, the number of the slave devices 14A through 14N is different from the number of peripheral devices 15A through 15M.

Figure 7:
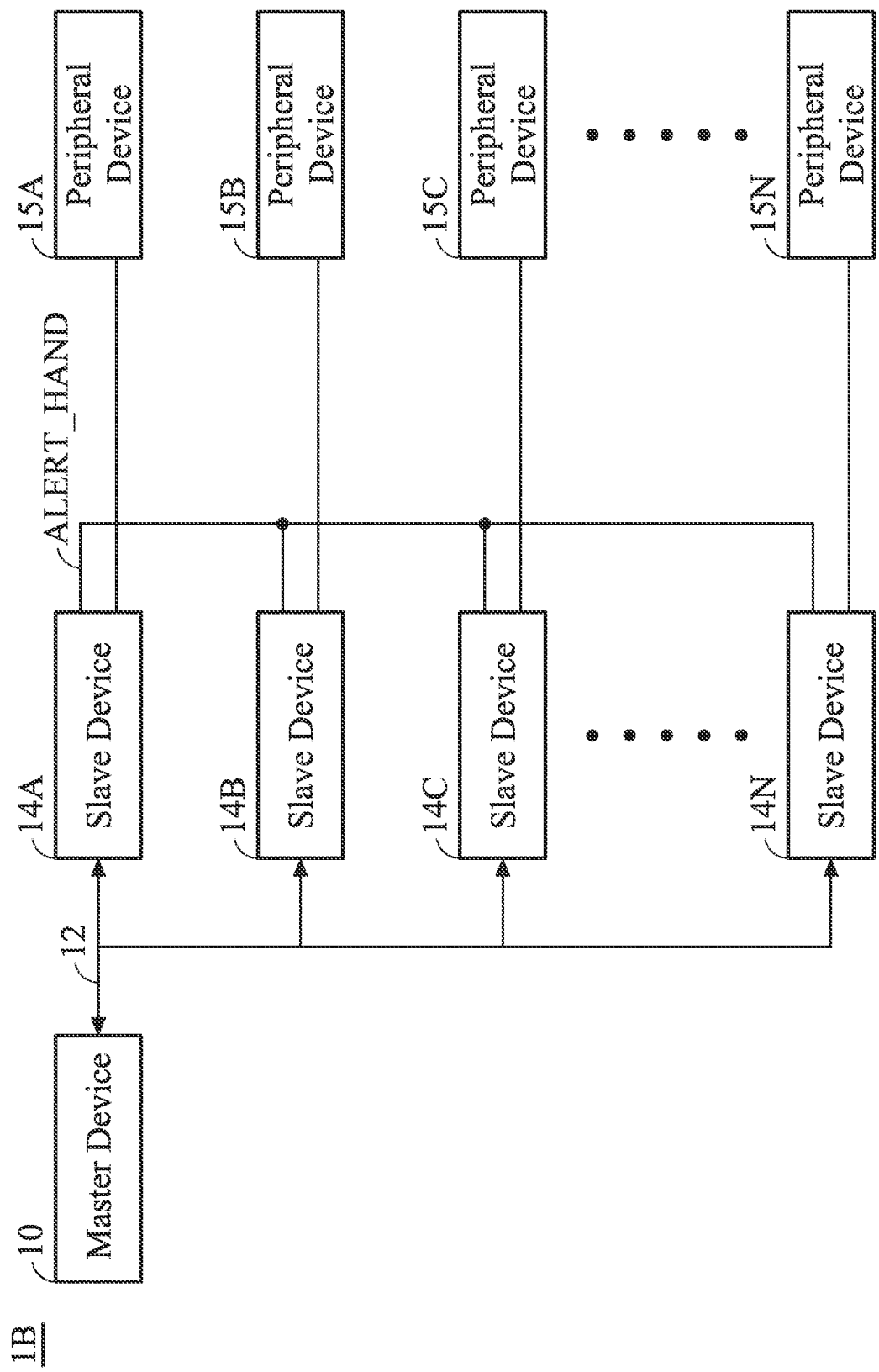
FIG. 7 shows the connection configuration of a bus system according to some embodiments of the invention.

FIG. 7 shows the connection configuration of a bus system 1B according to some embodiments of the invention. The bus system 1B in FIG. 7 has the configuration similar to that of the bus system 1A in FIG. 6, and the difference between the bus system 1B and the bus system 1A is that each of the peripheral devices 15A through 15N of the bus system 1B is controlled by the individual slave devices 14A through 14N. In some embodiments, the number of the slave devices 14A through 14N may be the same as the number of peripheral devices 15A through 15N.

In the bus system 1B, the master device 10 performs the eSPI communication with the slave devices 14A through 14N by using a one-to-one communication mechanism. Therefore, the master device 10 cannot simultaneously issue commands to the slave devices 14A through 14N through the bus 12. By using the alert handshake control line ALERT_HAND for the SWDA communication, the commands from the master device 10 can be sent to other slave devices, such as one-to-many broadcast. Therefore, it can save the time of the eSPI communication between the master device 10 and the slave devices 14A through 14N via the bus 12 individually. For example, when the master device 10 wants to disable the peripheral devices 15A through 15N, after receiving the instruction to disable the peripheral devices 15A through 15N, the slave device 14A is configured to disable the peripheral device 15A and immediately notify the slave devices 14B through 14N with the SWDA communication, so as to disable the peripheral devices 15B through 15N.

In some embodiments, when the slave device 14A receives a specific command from the master device 10 via the bus 12, the slave device 14A is configured to first notify the slave device 14B with the SWDA communication, so that the slave device 14B may perform related operations in advance. Therefore, when the slave device 14B receives the specific command from the master device 10 via the bus 12, the slave device 14B can immediately execute the operations corresponding to the specific command and continue to notify the slave device 14C with the SWDA communication, and so on, such as the operation of the branch prediction concept of the central processing unit. Therefore, the other slave devices can be notified in advance by using the SWDA communication, thereby improving the performance of the bus system 1B.

According to the embodiments of the invention, each slave device in the bus system 1 can perform the SWDA communication via the alert handshake control line ALERT_HAND. Compared with a conventional bus system, the slave device of the bus system 1, 1A and 1B does not require additional pins for SWDA communication. In addition, when the slave device communicates with the master device for the eSPI communication, the slave device is configured to use the window period (e.g., idle period) of the alert handshake control line ALERT_HAND for the SWDA communication, thereby increasing the efficiency and flexibility of bus systems 1, 1A and 1B in scheduling.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A bus system, comprising:
   a master device;
   an enhanced serial peripheral interface (eSPI) bus; and
   a plurality of slave devices electrically connected to the master device via the eSPI bus,
   wherein each of the plurality of slave devices has an alert handshake pin, and the alert handshake pins of the plurality of slave devices are electrically connected together via an alert handshake control line,
   wherein when the alert handshake control line is at a first voltage level and a first slave device of the slave devices wants to communicate with the master device, the first slave device is configured to control the alert handshake control line to a second voltage level via the alert handshake pin, so as to control the plurality of slave devices to enter a synchronization stage,
   wherein in a first phase of a plurality of phases of each of assignment periods in an assignment stage after the synchronization stage, the first slave device is configured to control the alert handshake control line to the second voltage level via the alert handshake pin, and in the phases of each of the assignment periods except for the first phase, the first slave device is configured to control the alert handshake control line to communicate with the plurality of slave devices other than the first slave device via the alert handshake pin, so as to transmit commands or data to other slave devices via the alert handshake control line,
   wherein the first phase corresponds to the first slave device;
   wherein in the phases of a first assignment period of the assignment stage except for the first phase, the first slave device is configured to control the alert handshake control line to transmit a target identification to the plurality of slave devices other than the first slave device via the alert handshake pin, so as to communicate with a second slave device of the plurality of slave devices corresponding to the target identification.

2. The bus system as claimed in claim 1, wherein in the phases of a second assignment period of the assignment stage except for the first phase, the first slave device is configured to control the alert handshake control line to transmit a first command to the second slave device via the alert handshake pin, wherein the first assignment period is between the second assignment period and the synchronization phase.

3. The bus system as claimed in claim 1, wherein when the slave device other than the first slave device detects that the alert handshake control line is at the second voltage level in the first stage of each of the assignment periods, the slave device other than the first slave device is configured to further determine whether to communicate with the first slave device according to the target identification.

4. The bus system as claimed in claim 2, wherein in response to the first command, the second slave device is configured to receive and store the data from the first slave device via the alert handshake control line, wherein the received data comprises a key or data to be computed.

5. The bus system as claimed in claim 4, wherein the second slave device is configured to determine whether to communicate with the master device according to the received data or the first command.

6. The bus system as claimed in claim 1, further comprising:
   a plurality of peripheral devices electrically connected to the plurality of slave devices via the alert handshake control line,
   wherein in the phases of each of the assignment periods except the first phase, the first slave device is configured to control the plurality of peripheral devices via the alert handshake control line.

7. The bus system as claimed in claim 1, further comprising:
   a plurality of peripheral devices, wherein each of the peripheral devices is electrically connected to a respective slave device,
   wherein in the phases of each of the assignment periods except the first phase, the first slave device is configured to communicate with the slave device other than the first slave device via the alert handshake control line, so as to control the peripheral device electrically connected to the slave device other than the first slave device.

8. The bus system as claimed in claim 1, wherein in the phases of each of the assignment periods except the first phase, the first slave device is configured to further communicate with the master device via the eSPI bus, so as to obtain a second command from the master device, and to provide a third command corresponding to the second command to the slave devices other than the first slave device via the alert handshake control line.

9. A bus system, comprising:
a master device;
an enhanced serial peripheral interface (eSPI) bus; and
a plurality of slave devices electrically connected to the master device via the eSPI bus,
wherein each of the plurality of slave devices has an alert handshake pin, and the alert handshake pins of the plurality of slave devices are electrically connected together via an alert handshake control line,
wherein when the alert handshake control line is at a first voltage level and a first slave device of the slave devices wants to communicate with the master device, the first slave device is configured to control the alert handshake control line to a second voltage level via the alert handshake pin, so as to control the plurality of slave devices enter a synchronization stage,
wherein after the synchronization stage, the plurality of slave devices other than the first slave device are configured to detect the alert handshake control line in a plurality of phases of each of assignment periods in an assignment stage except for a first phase of the phases, to determine whether to receive commands or data from the first slave device via the alert handshake control line,
wherein the first phase corresponds to the first slave device;
wherein in the phases of a first assignment period of the assignment stage except for the first phase, the first slave device is configured to control the alert handshake control line to transmit a target identification to the plurality of slave devices other than the first slave device via the alert handshake pin, so as to communicate with a second slave device of the plurality of slave devices corresponding to the target identification.

10. The bus system as claimed in claim 9, wherein in the first stage of each of the assignment periods of the assignment stage, the first slave device is configured to control the alert handshake control line to the second voltage level via the alert handshake pin.

11. The bus system as claimed in claim 9, wherein in the phases of a second assignment period of the assignment stage except for the first phase, the first slave device is configured to control the alert handshake control line to transmit a first command to the second slave device via the alert handshake pin, wherein the first assignment period is between the second assignment period and the synchronization phase.

12. The bus system as claimed in claim 9, wherein when the slave device other than the first slave device detects that the alert handshake control line is at the second voltage level in the first stage of each of the assignment periods, the slave device other than the first slave device is configured to further determine whether to communicate with the first slave device according to the target identification.

13. The bus system as claimed in claim 11, wherein in response to the first command, the second slave device is configured to receive and store the data from the first slave device via the alert handshake control line, wherein the received data comprises a key or data to be computed.

14. The bus system as claimed in claim 13, wherein the second slave device is configured to determine whether to communicate with the master device according to the received data or the first command.

15. The bus system as claimed in claim 9, wherein when the plurality of slave devices determine the alert handshake control line is maintained in the first voltage level in the phases of each of the assignment periods, the plurality of slave devices are configured to determine that the master device does not communicate with the plurality of slave devices.

16. The bus system as claimed in claim 9, further comprising:
a plurality of peripheral devices electrically connected to the plurality of slave devices via the alert handshake control line,
wherein in the phases of each of the assignment periods except the first phase, the first slave device is configured to control the peripheral devices via the alert handshake control line to communicate with the peripheral devices.

17. The bus system as claimed in claim 9, further comprising:
a plurality of peripheral devices, wherein each of the peripheral devices is electrically connected to a respective slave device,
wherein in the phases of each of the assignment periods except the first phase, the first slave device is configured to communicate with the slave device other than the first slave device via the alert handshake control line, so as to control the peripheral device electrically connected to the slave device other than the first slave device.

18. The bus system as claimed in claim 9, wherein in the phases of each of the assignment periods except the first phase, the first slave device is configured to further communicate with the master device via the eSPI bus, so as to obtain a second command from the master device, and to provide a third command corresponding to the second command to the slave devices other than the first slave device via the alert handshake control line.

* * * * *